United States Patent
Dantes et al.

(10) Patent No.: US 6,840,467 B2
(45) Date of Patent: Jan. 11, 2005

(54) FUEL-INJECTION VALVE

(75) Inventors: Guenter Dantes, Eberdingen (DE); Detlef Nowak, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 10/149,094

(22) PCT Filed: Oct. 2, 2001

(86) PCT No.: PCT/DE01/03787

§ 371 (c)(1),
(2), (4) Date: Oct. 17, 2002

(87) PCT Pub. No.: WO02/29243

PCT Pub. Date: Apr. 11, 2002

(65) Prior Publication Data

US 2003/0116658 A1 Jun. 26, 2003

(30) Foreign Application Priority Data

Oct. 6, 2000 (DE) .......................................... 100 49 544

(51) Int. Cl.[7] .......................... B05B 1/30; F02M 39/00; F02M 61/10
(52) U.S. Cl. ............................... 239/585.1; 239/585.5; 239/533.3; 239/533.11; 239/88
(58) Field of Search .......................... 239/585.1–585.5, 239/533.2, 533.3, 533.7, 533.8, 533.9, 88–92, 533.11; 251/129.15, 129.21

(56) References Cited

U.S. PATENT DOCUMENTS

| 5,271,563 | A | | 12/1993 | Cerny et al. |
| 5,465,910 | A | * | 11/1995 | Hall et al. ............... 239/585.4 |
| 5,497,947 | A | * | 3/1996 | Potz et al. ............. 239/533.12 |
| 5,544,816 | A | * | 8/1996 | Nally et al. ............. 239/585.5 |
| 5,755,385 | A | * | 5/1998 | Potz et al. ............... 239/533.2 |
| 6,279,844 | B1 | * | 8/2001 | Shen et al. ............. 239/585.4 |

FOREIGN PATENT DOCUMENTS

| DE | 196 25 059 | 1/1998 |
| DE | 198 12 092 | 9/1998 |
| DE | 198 14 693 | 10/1998 |

* cited by examiner

Primary Examiner—Davis Hwu
(74) Attorney, Agent, or Firm—Kenyon & Kenyon

(57) ABSTRACT

Fuel injector, in particular, a fuel injector for the direct injection of fuel into a combustion chamber of an internal combustion engine is described having an actuator for actuating a valve needle, the valve needle having on an injection-side end a valve-closure member which forms a sealing seat together with a valve-seat surface, which is formed on a valve-seat member. Fuel channels are arranged in a valve needle guide, connected to the valve-seat member or designed as a single piece with it, in several rows circumferentially in the valve needle guide, at least one row of fuel channels being arranged, in the resting state of the fuel injector, above a guide line of the valve-closure member.

10 Claims, 2 Drawing Sheets

FUEL-INJECTION VALVE

FIELD OF THE INVENTION

The present invention relates to a fuel injector.

BACKGROUND INFORMATION

German Published patent Application No. 196 25 059 discusses a fuel injector that has, in a flow path of the fuel from a fuel supply to an injection opening, several fuel channels whose cross-section may determine the fuel quantity injected per time unit at a specified fuel pressure. In order to influence the fuel distribution in an injected fuel cloud, at least a portion of the fuel channels may be oriented in such a manner that the fuel jets emerging from them are injected directly through the injection opening.

It may be undesirable in the fuel injector discussed in the above document that the fuel channels are arranged in a plane perpendicular to the flow direction of the fuel, and the openings thus are arranged on a circle around a valve needle guide connected to the valve-seat surface support. In this manner, the fuel quantity flowing through the fuel injector may not be metered accurately enough when the valve-closure member is lifted off of the sealing seat.

Furthermore, the number of bore holes may not be sufficient to generate an adequate homogenous fuel cloud that is sufficient to meet the stoichiometric requirements for full combustion. This may also be additionally exacerbated by the large diameter of the fuel channels.

SUMMARY OF THE INVENTION

A fuel injector according to the present invention may have, by contrast, the feature that the adjustment of the fuel flowing through the fuel injector may be accomplished with a high level of accuracy by the application of a slide valve principle with several rows of fuel channels arranged circumferentially.

The fuel channels may be axially offset from each other from row to row so that a homogenous mixture cloud may be generated.

By the arrangement of the fuel channels with a tangential component relative to the center line of the fuel injector, the fuel may be given a swirl which may also provide a good preparation of the mixture cloud.

The fuel channels may be inclined relative to a reference plane perpendicular to the center line of the fuel injector, whereby the hydrodynamic properties of the fuel channels may be improved.

DETAILED DESCRIPTION

Figure 1:
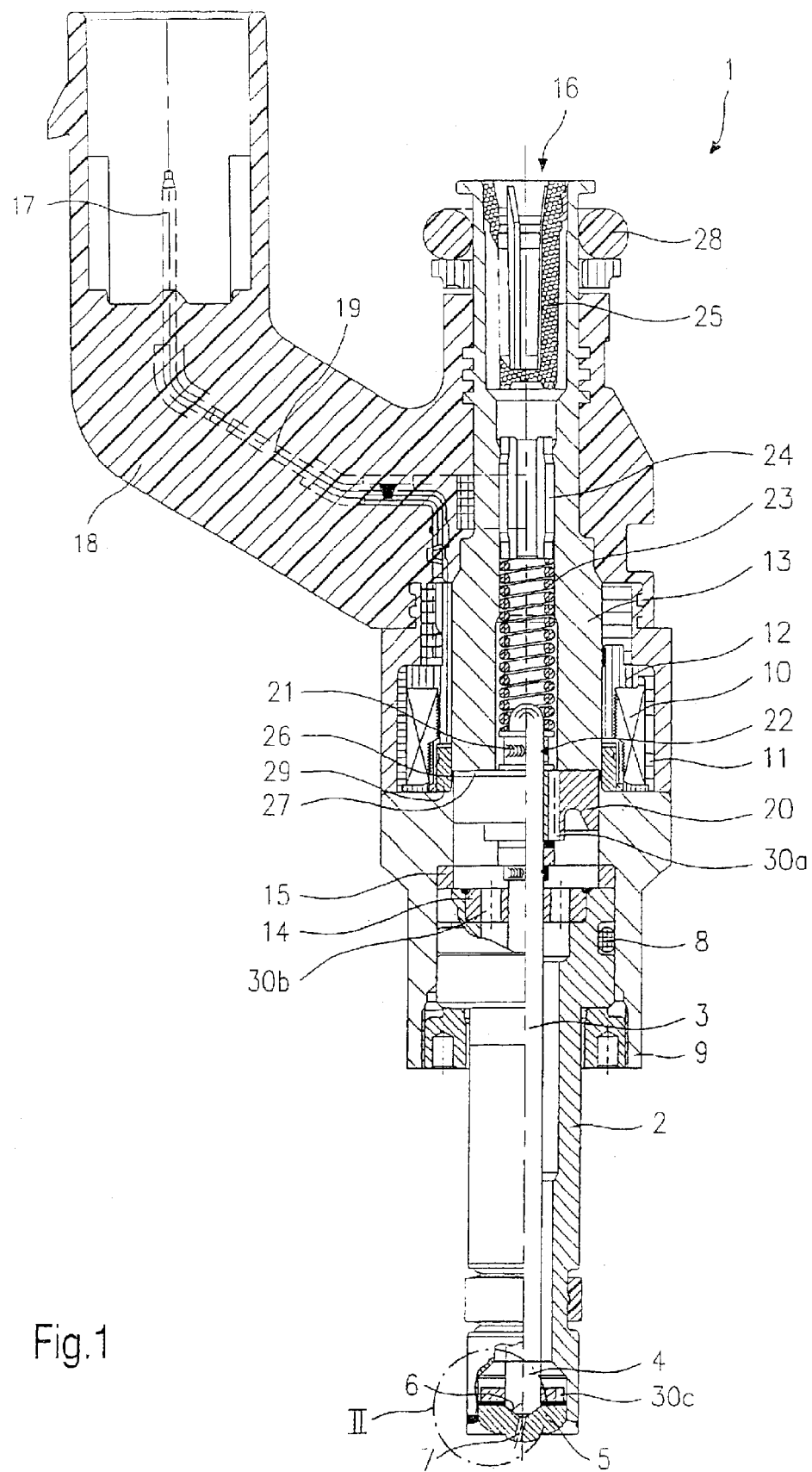
FIG. 1 shows a schematic section through an example embodiment of a fuel injector according to the related art.

Before an example embodiment of a fuel injector 1 according to the present invention is described in greater detail with reference to FIGS. 2 and 3, a fuel injector 1 embodying the related art is explained briefly with reference to FIG. 1 with regard to its essential components, for better understanding of the invention.

Fuel injector 1 is configured in the form of a fuel injector for fuel injection systems of a mixture-compressing, spark ignition internal combustion engine. Fuel injector 1 may be suitable for direct injection of fuel into a combustion chamber of an internal combustion engine (not shown).

Fuel injector 1 includes a nozzle body 2, in which a valve needle 3 is arranged. Valve needle 3 is mechanically linked to a valve-closure member 4, which cooperates with a valve-seat surface 6 situated on a valve-seat member 5 to form a sealing seat. Fuel injector 1 in the example embodiment is a fuel injector 1 that opens to the inside and which has an injection opening 7. Nozzle body 2 is sealed off by a seal 8 from external pole 9 of a solenoid 10. Solenoid 10 is encapsulated in a coil housing 11 and wound on a bobbin 12 which sits on the internal pole 13 of the solenoid 10. Internal pole 13 and external pole 9 are separated from each other by a gap 26 and are supported on a connecting piece 29. Solenoid 10 is excited via a line 19 by an electric current that may be supplied via an electric plug contact 17. Plug contact 17 is surrounded by a plastic sheath 18, which may be extruded onto internal pole 13.

Valve needle 3 is guided in a valve needle guide 14, which is designed in a disc shape. A matching adjustment disc 15 functions to adjust the lift. An anchor 20 is located on the other side of adjustment disc 15. This anchor is connected via a first flange 21 in a friction-fit manner to valve needle 3, which is connected to first flange 21 by a weld seam 22. A restoring spring 23, which in the model of fuel injector 1 presented here is pre-stressed by a sleeve 24, is supported on first flange 21.

A second flange 31, which is connected to valve needle 3 via a weld seam 33, functions as a lower anchor stop. An elastic intermediate ring 32, which rests on second flange 31, prevents rebounding when the fuel injector 1 is closed.

Fuel channels 30a to 30c, which conduct the fuel, which is supplied via a central fuel supply 16 and filtered by a filter element 25, to the injection opening 7, run in valve needle guide 14, in anchor 20, and on valve-seat member 5. Fuel injector 1 is sealed off by a seal 28 from a fuel line (not shown).

When fuel injector 1 is at rest, anchor 20 of restoring spring 23 is acted upon against its lift direction in such a manner that valve-closure member 4 is held in a sealing contact on valve-seat surface 6. When solenoid 10 is excited, it generates a magnetic field, which moves anchor 20 against the spring force of restoring spring 23 in the lift direction, the lift being defined by an operating gap 27 located, in the rest position, between internal pole 12 and anchor 20. Anchor 20 takes flange 21, which is welded to valve needle 3, along with it in the lift direction. Valve-closure member 4 that is mechanically linked to valve needle 3 lifts away from valve-seat surface 6 and the fuel that is conducted via fuel channels 30a to 30c to injection opening 7 is injected.

If the coil current is turned off, after the magnetic field has sufficiently decayed, anchor 20 drops off internal pole 13 due to the pressure of the restoring spring 23, whereby flange 21, which is mechanically linked to valve needle 3, moves against the lift direction. Valve needle 3 is moved in this manner in the same direction whereby the valve-closure member 4 is set on valve-seat surface 6 and fuel injector 1 is closed.

Figure 2:
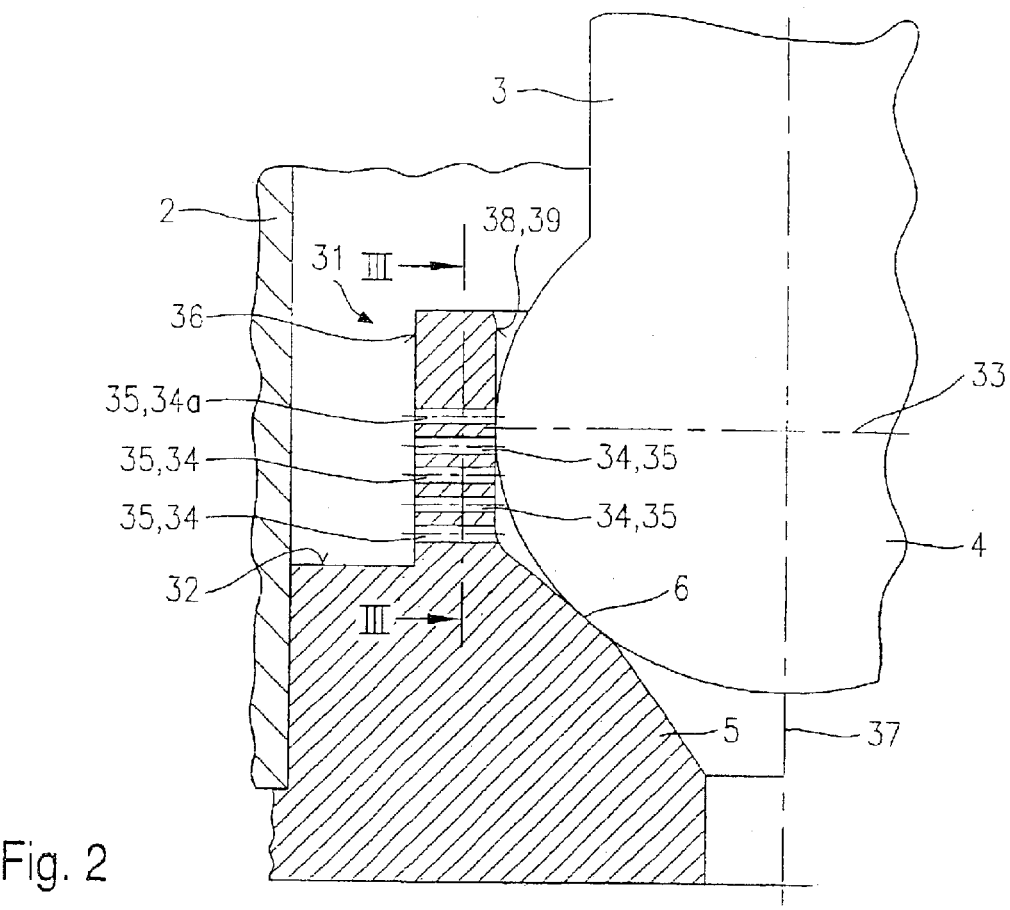
FIG. 2 shows a schematic section through a first example embodiment of the fuel injector according to the present invention in the area II of FIG. 1.

FIG. 2 shows, as a section of a detail, an example embodiment of a fuel injector 1 according to the present invention. The section shown is indicated in FIG. 1 by II.

The example embodiment shown in FIG. 2, of a fuel injector according to the present invention, has a valve needle guide 31, which is formed on an inlet side face 32 of valve-seat member S. Valve needle guide 31 may be configured here in a single piece with valve-seat member 5 or, for example, be connected with valve-seat member 5 by welding, soldering, or similar methods. Valve needle guide 31 is configured as a hollow cylinder.

In the example embodiment presented here, valve needle 3 has a ball-shaped valve-closure member 4. Valve-closure member 4 forms a sealing seat with valve-seat surface 6 formed on valve-seat member 5. Valve-closure member 4 is guided through valve needle guide 31, guide line 33 of valve-closure member 4 resting on an inner wall 38 of valve needle guide 31. In the area of guide line 33, i.e., between guide line 33 and the sealing seat, several rows 34 of fuel channels 35 are arranged in valve needle guide 31 and extend from a radially external side 36 of valve needle guide 31 to a radially internal side 39. In the resting state, in which valve-closure member 4 rests on valve-seat surface surface 6, in this example embodiment, one row 34a of these rows is arranged on the inlet side of guide line 33, while the other rows 34 are arranged between guide line 33 and valve-seat surface 6.

Fuel channels 35 may run here either perpendicular to a center line 37 of fuel injector 1 or inclined at an angle α relative to an orientation perpendicular to center line 37 in the downstream direction. The latter arrangement may be more favorable hydrodynamically.

When fuel injector 1 is actuated, valve needle 3 is moved opposite the flow direction of the fuel, and fuel channels 35 of rows 34 are opened. Fuel flows from a radially external side 36 of valve needle guide 31 through fuel channels 35 in the direction of the sealing seat. In the starting phase of the opening operation, only those fuel channels 35 of those rows 34 which are arranged on the downstream side of guide line 33 of valve-closure member 4 are opened. Fuel channels 35 of uppermost row 34a, which in the resting state is arranged on the inlet side of guide line 33 of valve-closure member 4, remain closed at first. Once valve needle 3 has performed a specified partial lift, uppermost row 34a is opened to allow flow.

By this two-part spatial arrangement of fuel channels 35, an expensive lift modeling of valve needle 3 may be avoided without impairing metering accuracy. Fuel channels 35 of rows 34 are arranged in such a manner that a defined fuel quantity which is somewhat smaller than a required fuel quantity flows through. The flow through uppermost row 34a of fuel channels may be varied by changing the opening stop of valve needle 3 until reaching an exact fuel quantity. By corresponding adjustment of the lift of valve needle 3, exactly as much fuel flows through uppermost row 34a of fuel channels 35, as may be required in the context of the flow accuracy that is to be obtained.

Figure 3:
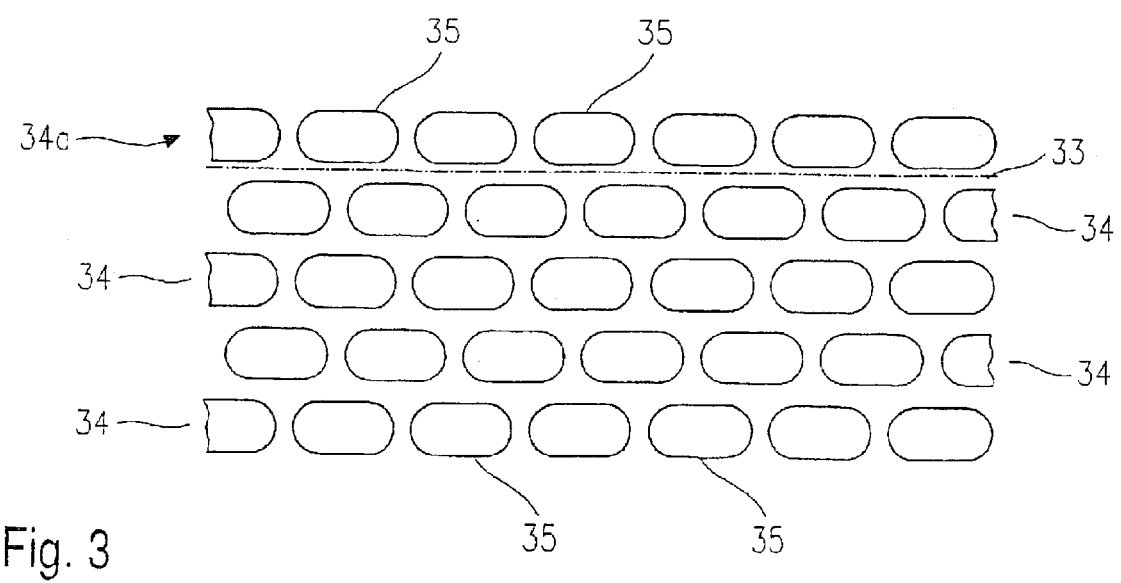
FIG. 3 shows a schematic section along line III—III in FIG. 2.

FIG. 3 shows a schematic section along line III—III in FIG. 2, through valve needle guide 31 in the area of the fuel channels 35. Fuel channels 35 of rows 34 are arranged axially offset from each other in the example embodiment shown, in order to produce as homogenous a mixture cloud as possible. However, the fuel channels 35 may also be arranged without axial offset. In order to achieve the required metering accuracy, fuel channels 35 have a very small diameter, for example, smaller than 100 μm, and in particular, smaller than or equal to 70 μm. The manufacture of these small-calibrated bore holes may be done by laser machining, for example.

Since fuel channels 35 may have a tangential component relative to center line 37 of fuel injector 1 in order to produce a swirl, the cross-section of fuel channels 35 appears oval in FIG. 3. The orientation of the tangential components of fuel channels 35 in each row 34, 34a may be in the same direction relative to the other rows 34, 34a. The example embodiment presented, of a fuel injector 1 according to the present invention, thus may combine the preparation of the swirl with a refinement of the dosed fuel quantity.

The present invention may not be limited to the example embodiment shown and, for example, may also be applied for fuel injector 1 with piezoelectric and magnetostrictive actuators or any desired arrangements of fuel channels 33.

What is claimed is:

1. A fuel injector, comprising:

a valve-seat member including a valve-seat surface formed on the valve-seat member;

a valve needle including a valve-closure member arranged on an injection-side end thereof, the valve-closure member including a guide line, the valve-seat surface and the valve-closure member forming a sealing seat;

an actuator for actuating the valve needle; and a valve needle guide configured to one of connect to the valve-seat member and be formed as a single piece with the valve-seat member, the valve needle guide including fuel channels arranged circumferentially in a plurality of rows, the fuel channels including at least one row arranged above the guide line if the fuel injector is in a resting state;

wherein remaining rows of the fuel channels are arranged between the valve-seat surface and the guide line.

2. The fuel injector according to claim 1, wherein the fuel injector is used for a direct injection of fuel into a combustion chamber of an internal combustion engine.

3. The fuel injector according to claim 1, wherein the valve needle guide is formed on an inlet-side end face of the valve-seat member.

4. The fuel injector according to claim 1, wherein the valve needle guide extends as a hollow cylinder from an end face of the valve-seat member.

5. The fuel injector according to claim 1, wherein the fuel channels are arranged axially offset from one another.

6. The fuel injector according to claim 1, wherein the fuel channels have tangential components relative to a center line of the fuel injector.

7. The fuel injector according to claim 6, wherein each tangential component is oriented in a same direction.

8. The fuel injector according to claim 1, wherein the fuel channels are formed in a plane perpendicular to a center line of the fuel injector.

9. The fuel injector according to claim 8, wherein the fuel channels are inclined at an angle relative to an orientation radial to the center line.

10. A fuel injector, comprising:

a valve-seat member including a valve-seat surface formed on the valve-seat member;

a valve needle including a valve-closure member arranged on an injection-side end thereof, the valve-closure member including a guide line, the valve-seat surface and the valve-closure member forming a sealing seat;

an actuator for actuating the valve needle; and a valve needle guide configured to one of connect to the valve-seat member and be formed as a single piece with the valve-seat member, the valve needle guide including fuel channels arranged circumferentially in a plurality of rows, the fuel channels including at least one row arranged above the guide line if the fuel injector is in a resting state;

wherein the valve needle guide is formed on an inlet-side end face of the valve-seat member;

wherein the valve needle guide extends as a hollow cylinder from an end face of the valve-seat member, and wherein the valve needle guide includes an inner wall on which the valve-closure member rests in an area of the guide line.

* * * * *